(12) United States Patent
Sathyanarayana et al.

(10) Patent No.: US 8,857,039 B2
(45) Date of Patent: Oct. 14, 2014

(54) ELECTRICAL BOX CONDUIT CONNECTORS AND METHODS FOR MAKING AND USING THE SAME

(75) Inventors: Ashok Alilughatta Sathyanarayana, Pune (IN); Ashwin Mrityunjayagoud Patil, Pune (IN); Robert Alan Krosky, Raleigh, NC (US)

(73) Assignee: Sigma Electric Manufacturing Corporation, Garner, NC (US)

( * ) Notice: Subject to any disclaimer, the term of this patent is extended or adjusted under 35 U.S.C. 154(b) by 776 days.

(21) Appl. No.: 13/028,538

(22) Filed: Feb. 16, 2011

(65) Prior Publication Data

US 2011/0204619 A1 Aug. 25, 2011

Related U.S. Application Data

(60) Provisional application No. 61/306,095, filed on Feb. 19, 2010.

(51) Int. Cl.
*H02G 3/06* (2006.01)

(52) U.S. Cl.
CPC .................................. *H02G 3/0691* (2013.01)
USPC ...... 29/525.03; 174/135; 439/470; 29/525.02

(58) Field of Classification Search
CPC .................................................... H02G 3/0691
USPC ................... 411/354, 433; 24/136 R, 115 M; 174/655, 660, 665, 663, 51, 135, 68.1, 174/481; 285/154.1, 154.2; 439/818, 847, 439/863, 452, 453, 455, 470; 13/149, 154, 13/155; 29/525.01–525.03
See application file for complete search history.

(56) References Cited

U.S. PATENT DOCUMENTS

| | | | |
|---|---|---|---|
| 1,049,283 A | 12/1912 | Westphal |
| 1,131,399 A | 3/1915 | McGinley |
| 1,355,450 A | 10/1920 | Carlson |
| 1,659,094 A | 2/1928 | Godfrey |
| 2,275,800 A | 3/1942 | Olson |
| 2,365,785 A | 12/1944 | Tinnerman |

(Continued)

FOREIGN PATENT DOCUMENTS

| | | |
|---|---|---|
| CA | 1120113 | 3/1982 |
| FR | 2863682 A1 | 6/2005 |
| GB | 1422355 | 1/1976 |
| GB | 2177268 A | 1/1987 |

OTHER PUBLICATIONS

French Patent No. 2863682 (A1); Publication Date: Jun. 17, 2005; Abstract Only; 1 Page.

*Primary Examiner* — David Bryant
*Assistant Examiner* — Steven A Maynard
(74) *Attorney, Agent, or Firm* — Cantor Colburn LLP (57) ABSTRACT

In one embodiment, the conduit connector comprises a body, a cover, and a slide located in the channel. Optionally, the body can comprising a box engagement region capable of engaging an opening in an enclosure and a channel having body sides that diverge from an inlet end toward an outlet end, wherein the sides have a cover connector. The cover can be disposed across the channel and mated with the cover connector. The slide can optionally comprise slide sides that diverge toward the outlet end, a bore extending into the slide from a first end, and protrusions extending from the slide into the channel and having a size and geometry to engage a groove on a conduit.

11 Claims, 5 Drawing Sheets

(56) References Cited

U.S. PATENT DOCUMENTS

| | | | |
|---|---|---|---|
| 2,518,426 A | 8/1950 | Kinander | |
| 2,973,212 A | 2/1961 | Rose | |
| 3,349,946 A | 10/1967 | Lee | |
| 3,369,071 A | 2/1968 | Tuisku | |
| 3,628,221 A * | 12/1971 | Pasbrig | 403/18 |
| 4,021,604 A | 5/1977 | Dola et al. | |
| 4,151,363 A | 4/1979 | Nichols | |
| 4,180,227 A | 12/1979 | Gretz | |
| 4,192,532 A | 3/1980 | Pacella | |
| 4,198,537 A | 4/1980 | Mariani | |
| 4,302,035 A | 11/1981 | Ochwat | |
| 4,494,779 A | 1/1985 | Neff et al. | |
| 4,496,791 A | 1/1985 | Reichert et al. | |
| 4,619,332 A | 10/1986 | Sheehan | |
| 4,621,166 A | 11/1986 | Neuroth | |
| 4,640,433 A | 2/1987 | Jorgensen et al. | |
| 4,641,863 A | 2/1987 | Shemtov | |
| 4,692,561 A | 9/1987 | Nattel | |
| 4,692,562 A | 9/1987 | Nattel | |
| 4,699,217 A | 10/1987 | McLennan et al. | |
| 4,711,472 A | 12/1987 | Schnell | |
| 4,789,759 A | 12/1988 | Jones | |
| 4,831,496 A | 5/1989 | Brant et al. | |
| 4,842,548 A | 6/1989 | Bolante | |
| 4,872,087 A | 10/1989 | Brant | |
| 4,880,387 A | 11/1989 | Stikeleather et al. | |
| 4,885,429 A | 12/1989 | Schnittker | |
| 4,919,370 A | 4/1990 | Martin et al. | |
| 4,984,995 A | 1/1991 | Tucker et al. | |
| 4,990,721 A | 2/1991 | Sheehan | |
| 5,059,747 A | 10/1991 | Bawa et al. | |
| 5,068,496 A | 11/1991 | Favalora | |
| 5,118,057 A | 6/1992 | Martin et al. | |
| 5,132,493 A | 7/1992 | Sheehan | |
| 5,171,164 A | 12/1992 | O'Neil et al. | |
| 5,189,258 A | 2/1993 | Pratesi | |
| 5,200,575 A | 4/1993 | Sheehan | |
| 5,204,499 A | 4/1993 | Favalora | |
| 5,266,050 A | 11/1993 | O'Neil et al. | |
| 5,285,013 A | 2/1994 | Schnell et al. | |
| 5,342,994 A | 8/1994 | Pratesi | |
| 5,346,264 A | 9/1994 | Law et al. | |
| 5,373,106 A | 12/1994 | O'Neil et al. | |
| 5,374,017 A | 12/1994 | Martin et al. | |
| 5,405,172 A | 4/1995 | Mullen, Jr. | |
| 5,422,437 A | 6/1995 | Schnell | |
| 5,539,152 A | 7/1996 | Gretz | |
| 5,543,582 A | 8/1996 | Stark et al. | |
| D377,506 S | 1/1997 | Shaw | |
| 5,731,543 A | 3/1998 | Jorgensen | |
| RE35,820 E | 6/1998 | Guginsky | |
| 5,775,739 A | 7/1998 | Gretz | |
| 5,789,706 A | 8/1998 | Perkins | |
| 5,866,853 A | 2/1999 | Sheehan | |
| 5,894,109 A | 4/1999 | Marik | |
| 5,912,431 A | 6/1999 | Sheehan | |
| 5,951,327 A | 9/1999 | Marik | |
| 5,959,246 A | 9/1999 | Gretz | |
| 6,020,557 A | 2/2000 | Jorgensen | |
| 6,034,326 A | 3/2000 | Jorgensen | |
| 6,043,432 A | 3/2000 | Gretz | |
| 6,058,574 A * | 5/2000 | Facey et al. | 24/136 R |
| 6,080,933 A | 6/2000 | Gretz | |
| 6,100,470 A | 8/2000 | Gretz | |
| 6,114,630 A | 9/2000 | Gretz | |
| 6,114,631 A | 9/2000 | Gretz | |
| 6,133,529 A | 10/2000 | Gretz | |
| 6,140,582 A | 10/2000 | Sheehan | |
| 6,143,982 A | 11/2000 | Gretz | |
| 6,162,995 A | 12/2000 | Bachle et al. | |
| 6,177,633 B1 | 1/2001 | Gretz | |
| 6,194,661 B1 | 2/2001 | Gretz | |
| 6,231,088 B1 | 5/2001 | Balthazard et al. | |
| 6,262,369 B1 | 7/2001 | Marik et al. | |
| 6,300,569 B1 | 10/2001 | Mullen, Jr. | |
| 6,310,290 B1 | 10/2001 | Gretz | |
| 6,335,488 B1 | 1/2002 | Gretz | |
| 6,352,439 B1 | 3/2002 | Stark et al. | |
| 6,355,884 B1 | 3/2002 | Gretz | |
| 6,380,483 B1 | 4/2002 | Blake | |
| 6,444,907 B1 | 9/2002 | Kiely | |
| 6,476,319 B1 | 11/2002 | Shemtov | |
| 6,479,754 B1 * | 11/2002 | Muzslay | 174/135 |
| 6,521,831 B1 | 2/2003 | Gretz | |
| 6,521,833 B1 | 2/2003 | DeFreitas | |
| 6,537,103 B2 | 3/2003 | Jamison | |
| 6,538,201 B1 | 3/2003 | Gretz | |
| D473,333 S | 4/2003 | Willmorth | |
| 6,555,749 B1 | 4/2003 | Pyron | |
| 6,555,750 B2 | 4/2003 | Kiely | |
| 6,596,939 B1 | 7/2003 | Gretz | |
| 6,604,400 B1 | 8/2003 | Gretz | |
| 6,642,451 B1 | 11/2003 | Gretz | |
| 6,670,553 B1 | 12/2003 | Gretz | |
| 6,682,355 B1 | 1/2004 | Gretz | |
| 6,709,280 B1 | 3/2004 | Gretz | |
| 6,737,584 B2 | 5/2004 | Kiely | |
| 6,767,032 B1 | 7/2004 | Gretz | |
| 6,768,057 B2 | 7/2004 | Blake | |
| 6,780,029 B1 | 8/2004 | Gretz | |
| 6,809,263 B2 | 10/2004 | Jackson | |
| 6,827,604 B1 | 12/2004 | White | |
| 6,849,803 B1 | 2/2005 | Gretz | |
| 6,857,606 B1 | 2/2005 | Gretz | |
| 6,860,758 B1 | 3/2005 | Kiely | |
| 6,872,886 B2 | 3/2005 | Kiely | |
| 6,916,988 B1 | 7/2005 | Auray et al. | |
| 6,935,890 B1 | 8/2005 | Gretz | |
| 6,935,891 B2 | 8/2005 | Kiely | |
| 6,957,968 B1 | 10/2005 | Gretz | |
| D515,231 S | 2/2006 | Randazzo et al. | |
| 7,022,914 B1 | 4/2006 | Kiely | |
| 7,039,988 B2 * | 5/2006 | De France | 24/136 R |
| 7,045,714 B1 | 5/2006 | Kiely | |
| 7,057,107 B2 | 6/2006 | Auray et al. | |
| 7,060,900 B1 | 6/2006 | Gretz | |
| 7,064,272 B2 | 6/2006 | Auray et al. | |
| 7,064,273 B1 | 6/2006 | Kiely | |
| 7,075,007 B2 | 7/2006 | Auray et al. | |
| 7,078,623 B1 | 7/2006 | Sheehan | |
| 7,126,064 B1 | 10/2006 | Shemtov | |
| 7,148,431 B2 | 12/2006 | Pyron | |
| 7,151,223 B2 | 12/2006 | Auray et al. | |
| 7,154,042 B2 | 12/2006 | Auray et al. | |
| 7,154,054 B1 | 12/2006 | Gretz | |
| 7,156,671 B2 | 1/2007 | Kauth | |
| 7,161,095 B1 | 1/2007 | Gretz | |
| 7,164,086 B1 | 1/2007 | Kiely | |
| 7,183,486 B2 | 2/2007 | Pyron et al. | |
| 7,205,489 B2 | 4/2007 | Auray et al. | |
| 7,211,744 B2 | 5/2007 | Jorgensen | |
| 7,214,890 B2 | 5/2007 | Kiely et al. | |
| 7,220,923 B1 | 5/2007 | Sheehan et al. | |
| 7,226,308 B1 | 6/2007 | Hanks | |
| 7,226,309 B1 | 6/2007 | Gretz | |
| 7,238,894 B1 | 7/2007 | Gretz | |
| 7,304,251 B1 | 12/2007 | Gretz | |
| 7,329,144 B1 | 2/2008 | Gretz | |
| 7,338,087 B2 | 3/2008 | Bartholoma et al. | |
| 7,338,092 B1 | 3/2008 | Cicconi, III | |
| 7,358,448 B2 | 4/2008 | Auray et al. | |
| 7,381,088 B2 | 6/2008 | Gretz | |
| 7,390,979 B1 | 6/2008 | Johnson | |
| 7,390,980 B1 | 6/2008 | Gretz | |
| 7,432,452 B2 | 10/2008 | Gardner | |
| 7,442,079 B1 | 10/2008 | Gretz | |
| 7,461,870 B1 | 12/2008 | Blake | |
| 7,485,806 B1 | 2/2009 | Gretz | |
| 7,488,905 B2 | 2/2009 | Kiely et al. | |
| 7,495,184 B1 | 2/2009 | Gretz | |
| 7,500,873 B1 | 3/2009 | Hart | |
| 7,576,290 B1 * | 8/2009 | Korcz | 174/655 |
| 7,824,213 B1 * | 11/2010 | Korcz et al. | 439/552 |
| 2004/0251682 A1 | 12/2004 | Pyron | |

(56) References Cited

U.S. PATENT DOCUMENTS

| | | |
|---|---|---|
| 2008/0053680 A1 | 3/2008 | Kiely et al. |
| 2008/0277160 A1 | 11/2008 | Auray et al. |
| 2008/0284163 A1 | 11/2008 | Proulx et al. |
| 2009/0215306 A1 | 8/2009 | Hanks |
| 2009/0218131 A1 | 9/2009 | Sheehan et al. |
| 2010/0084854 A1 | 4/2010 | Sathyanarayana et al. |

* cited by examiner

ELECTRICAL BOX CONDUIT CONNECTORS AND METHODS FOR MAKING AND USING THE SAME

TECHNICAL FIELD

The instant application relates to adapters for connecting conduits to enclosures, e.g., connecting an electrical conduit to a junction box or other enclosure.

BACKGROUND

The most common use for electrical conduit connectors is to facilitate the connection of a conduit or cable to a junction box. The junction box can be a variety of electrical enclosures such as an outlet box, transformer enclosure, circuit panel, lighting fixture, etc. Similarly, the conduit can be rigid or flexible, or could be hose, other tubing capable of routing electrical wire or cable (e.g., fiber optic cable). Cable can be non-metallic sheathed cable, portable cord, or a variety of other types of electrical conductors. The instant application is equally successful in connecting a plurality of types of conduits, cables, and other electrical conductors to a wide variety of boxes and other enclosures. Therefore, as used in this specification, unless specifically stated otherwise, the term conduit is not limited to standard rigid electrical conduit, but shall be intended to mean any type of: conduit, cable, cord, or any other type of electrical conductor.

Many commercial and residential buildings have electrical installations with many types of conduit-to-junction box connections that utilize electrical connectors. The two most common types of electrical connectors are a snap-in connector and a multipart connector which can be composed of two or more components that utilize a threaded male end in conjunction with a threaded female locknut, hereinafter referred to collectively as a two-part locknut connector. In the case of the two-part locknut connector, the male threaded end is inserted into the junction box through a knockout (e.g., a hole or other opening). A rigid connection is established by threading the locknut onto the male end in the junction box interior. The snap-in connector is another commonly used connector, which utilizes a snap ring to quickly connect the connector to the junction box. Either type of connector is integrated with an adapter end, which allows the attachment of conduit, cable, or a variety of types of hollow tubing.

The installation of electrical systems is generally expensive as an electrician must first install the enclosures, route conduit between each enclosure, install connectors and then pull all necessary electrical wiring through the conduit. In other words, installation is expensive because it is labor intensive. The commercially available electrical connectors are one factor accentuating the labor intensiveness. Locknut connectors increase the cost of installing electrical systems for a number of reasons. The current art for two-part locknut connectors are plagued with labor intensive problems. First, the locknut connectors are shipped from the manufacturer preassembled. That is, the electrician must first remove the locknut from the male end before it can be installed. Once the male end of the connector is placed through the knockout, the electrician must rethread the locknut onto the connector from the interior of the junction box.

Two hands are required to disassemble and then reassemble the connectors in the knockout. Consequently, it is difficult to hold a tool or a piece of conduit while reassembling the connector. Once the locknut is threaded it must be tightened. In accordance with many building codes and safety regulations, connectors must be firmly and reliably attached to junction boxes. To properly tighten the two-part locknut connector, the electrician must use a tool, usually a set of pliers or a screwdriver. Occasionally, when the proper tool is unavailable, an electrician will use any object within reach. These situations, while rare, raise serious safety issues. In many instances, however, to "get the job done" the locknut is "finger" tightened. Those persons skilled in the art know that finger tightened two-part locknut connectors can eventually loosen, and a loose connector can cause great strain to be put onto the electrical wires and their connections resulting in an increase in the probability of, for example, disconnection of the wiring or poor grounding.

Secondly, when the electrician disassembles the fitting by taking the locknut off the connector, the locknut can be dropped or misplaced. This can occur when the electrician is in an elevated position, such as, on a scissor lift or on scaffolding because the electrical conduit is often installed in out-of-the-way places like in rafters and above ceilings. If the locknut cannot be found, the connector is useless. If the electrician decides to retrieve the dropped locknut, the installation time is prolonged.

The snap-in connector presents similar problems. However, the most significant problem is that these connectors, in most cases, do not create a rigid connection. Because the snap ring is sized to accept a variety of box wall thickness, it does not rigidly attach to many boxes. The loose fit may cause, for example, electrical continuity problems.

There remains a need to provide a generally universal connector that is easy to use; e.g., which can be installed quickly and easily without tools, does not require access to the interior of the junction box, and/or can be easily removed and reused in the box; and/or attains a firm connection to the box.

SUMMARY

Disclosed herein are conduit connectors and methods for making and using the same.

In one embodiment, the conduit connector comprises a body, a cover, and a slide located in the channel. Optionally, the body can comprise a box engagement region capable of engaging an opening in an enclosure and a channel having body sides that diverge from an inlet end toward an outlet end, wherein the sides have a cover connector. The cover can be disposed across the channel and mated with the cover connector. The slide can optionally comprise slide sides that diverge toward the outlet end, a bore extending into the slide from a first end, and protrusions extending from the slide into the channel and having a size and geometry to engage a groove on a conduit.

In one embodiment, a method for attaching a conduit to an enclosure, can comprise: moving a slider of a conduit connector to insert a conduit into a channel of the conduit connector, engaging the protrusions of the slide with convolutions on the conduit; and attaching the conduit connector to the enclosure.

In another embodiment, a method for attaching a conduit to an enclosure, can comprise: inserting a conduit into a channel and past a slider of a conduit connector, engaging the protrusions of the slide with convolutions on the conduit, and attaching the conduit connector to the enclosure.

The above described and other features are exemplified by the following figures and detailed description.

DETAILED DESCRIPTION

Disclosed herein are adapters (also known as conduit connectors and fittings) capable of connecting a conduit (e.g., electrical cable) to an enclosure, e.g., capable of connecting an electrical conduit to a junction box. The conduit connector, which can receive various sized cables, has a slider that can move to enable the insertion and/or removal of a range of cables and to enable it to engage or disengage the cables once it has been inserted into a channel in the body. The body has a box engagement portion capable of attaching to an opening (e.g., knockout), in an enclosure (e.g., of a junction box). For example, the box engagement portion can comprise tabs that engage an inside of an enclosure (such as snap-in tabs and/or immovable tabs), and/or a locknut box engagement portion. An optional spring clip can be located on the box engagement portion to engage the outside surface of the enclosure to securely maintain the connector attached thereto. In some embodiments, the conduit connector is preassembled before use, e.g., the body, cover, and slider, are assembled together. A conduit can then be inserted into the channel in the body. Once the conduit is in place, the slider can be moved toward the inlet end of the channel until the protrusions on the slider engage the conduit (e.g., sufficiently engage grooves on the conduit to establish a ground). In the various methods, the cable can be inserted into the cavity before or after attachment of the body to the enclosure and/or before or after attachment of the spring clip to the body.

The conduit can be a rigid or flexible conduit, or any type of hollow tubing commonly used in electrical installations. The conduit can be made from metal (e.g., zinc, steel, aluminum, iron, and so forth), plastic (e.g., polycarbonate, polyamide) or other commercially feasible and acceptable material, or a combination comprising at least one of the foregoing. The conduit can have grooves and ridges extending around its body.

The present design can have a generally wedge shaped body, e.g., triangular, with complementary outer body and slider. The slider can be movable relative to the body to enable the engagement/disengagement with a conduit. The actual angle of the wedge can be dependent upon the range of conduits desired to be received by the connector. This combination can be employed with any engagement portion that can attach the conduit connector to an enclosure. The connector can be sized according to the knockout diameter, e.g., sized to be received in knockouts having a diameter of 0.5 to 6 inches.

Refer now to FIGS. 1-6. In one embodiment, the conduit connector can comprise: a body 2, a cover 30, a compression spring 70, a slider 50, and/or a spring clip 80. The body 2 comprises a channel 12 therethrough for receiving the electrical conduit. One side of the body has an opening with cover connectors 14 extending from the body 2 and having a size and geometry for matingly engaging the cover 30. The sides 20 of the body have apertures 16,18 also configured to mate with the cover 30. The sides 20 of the body 2, can have a generally triangular shape with the height of the side decreasing toward the inlet end 24. In other words, the sides 20 can diverge from the inlet end 24 toward the outlet end 26.

The body 2 further comprises a box engagement region 4 capable of engaging an opening in an enclosure (commonly referred to as a knockout), while the spring clip 80 engages the connector and the enclosure. The box engagement region 4 can have a root surface 10, and radially extending tab(s), e.g., a leading tab 6 and a follower tab 8, wherein the root surface 10 and leading tab 6 can be located between a leading edge and a secondary edge. A leading tab perimeter edge and a follower tab perimeter edge define a tab perimeter diameter that is larger than an opening in the enclosure. It is understood that a lone leading tab 6 can operate with the root surface 10 or multiple leading tabs 6 in combination with one or a plurality of follower tabs 8. The leading and/or follower tabs can comprise a centering ledge. The centering ledge(s) in conjunction with centering flank(s) (oriented at the flank angle), imparts a self-centering feature of the body 2 in the knockout and eases assembly.

In some designs, the centering ledge can form a projection or lug, e.g., such as is illustrated in commonly assigned U.S. patent application Ser. No. 12/391,868, to Sheehan et al. The lug can project from the primary contact surface (e.g., the surface that contacts the interior of the box when the connector is attached thereto) toward the secondary edge such that, when the connector is connected to an enclosure (e.g., through a hole in a wall of the enclosure), the primary contact surface contacts the box interior surface, while the centering ledge exerts lateral pressure on the wall of the knockout edge. Optionally, the centering ledge can have a sufficient length to protrude out of the knockout toward the body (e.g., the lug can have a length that is greater than or equal to the knockout edge thickness, i.e., the thickness of the wall from interior surface to the exterior surface).

The body 2 can be formed from a variety of materials including, but not limited to, metal (e.g., zinc, steel, aluminum, iron, and so forth), plastic (e.g., polycarbonate, polyamide), or a combination comprising at least one of the foregoing, e.g., a plastic comprising metal fibers and/or particles. In addition, and depending on the type of material, the body 2 can be formed employing various techniques such as cast, pressed, machined from stock, molded (e.g., injection molded), or manufactured by other processes utilized for manufacturing electrical connectors.

Figure 1:
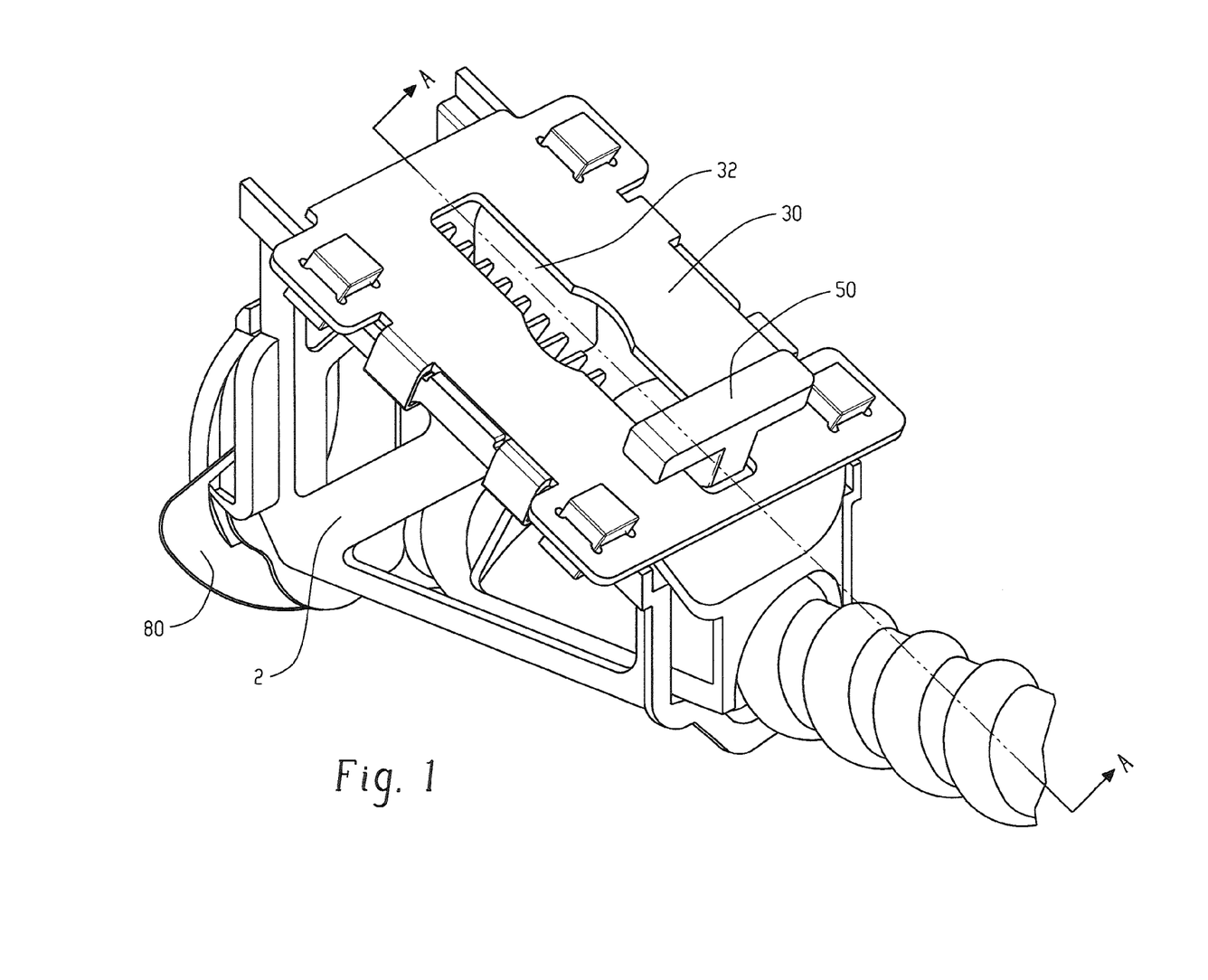
FIG. 1 is a perspective back/side view of an embodiment of an assembled conduit connector with an electrical conduit.
Figure 2:
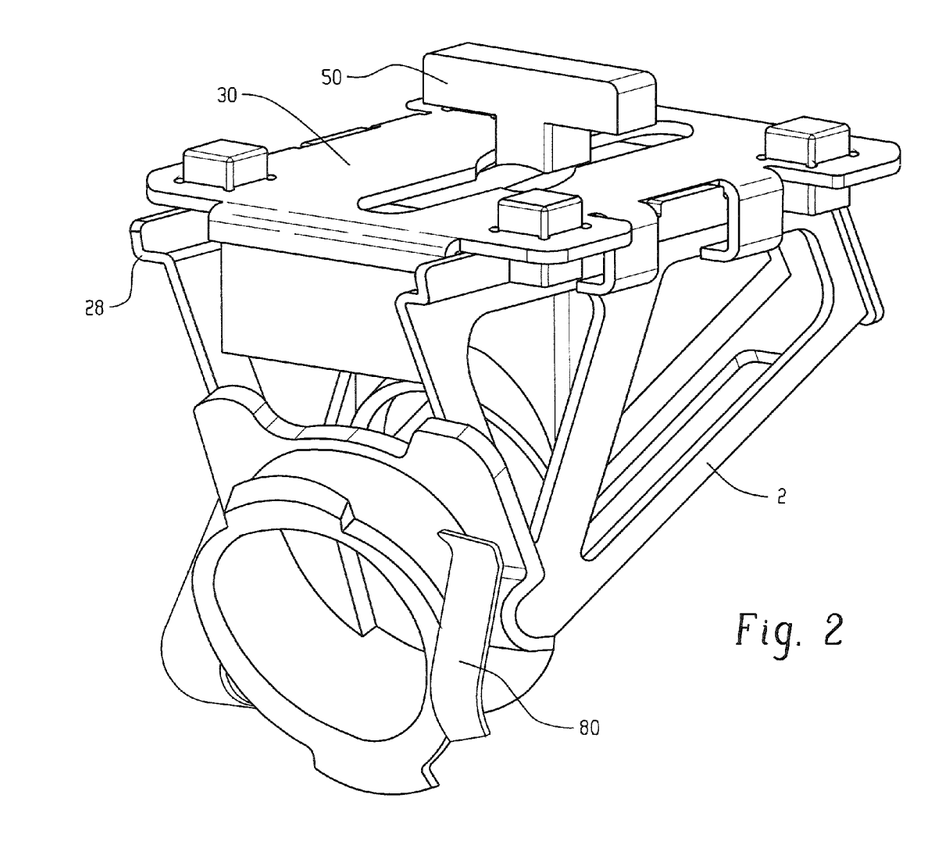
FIG. 2 is a perspective front/side view of an embodiment of the assembled conduit connector of FIG. 1, without the electrical conduit.
Figure 3:
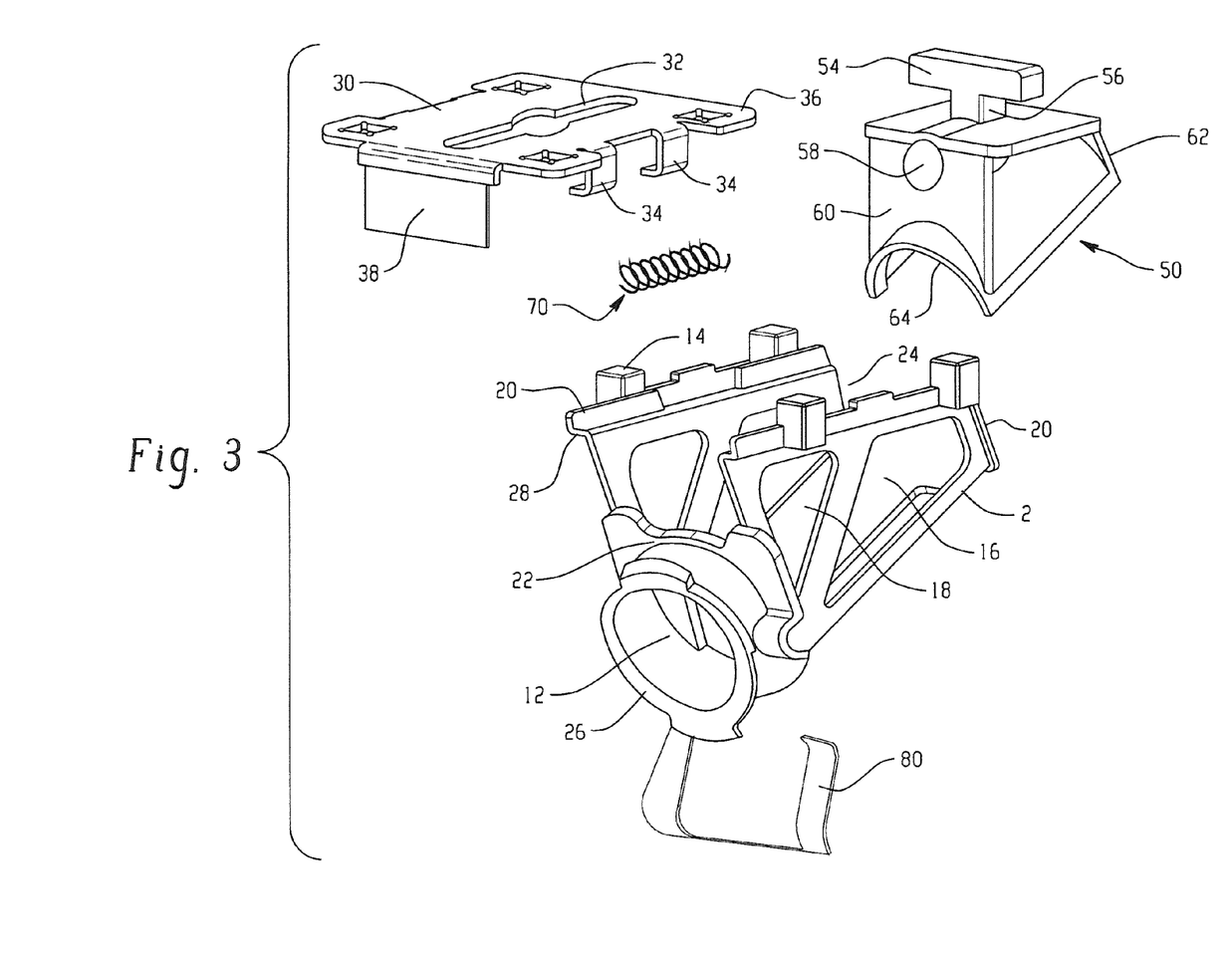
FIG. 3 is an exploded view of the disassembled conduit connector of FIG. 1.
Figure 4:
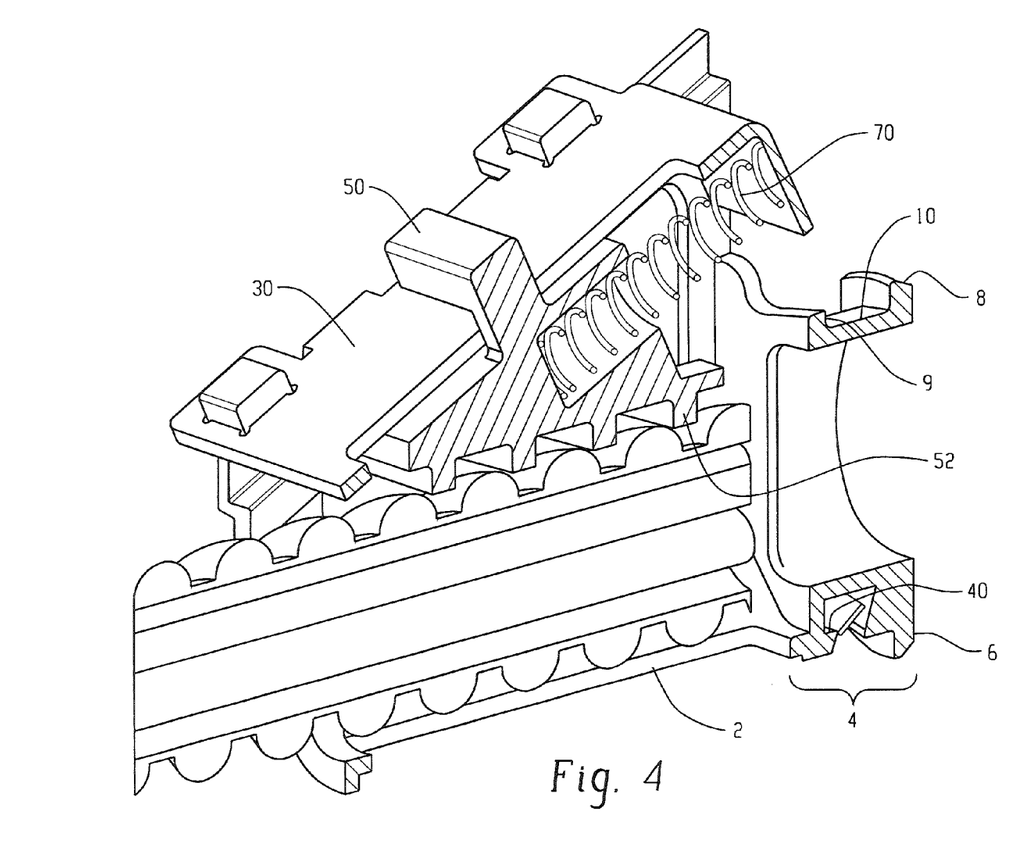
FIG. 4 is a cross-sectional view taken along lines A-A of FIG. 1.

The slider 50 also comprises a guide tab 54 connected to the slider 50 via a tab extension 56. The guide tab 54 is configured to be located external to the cover 30 when the cover 30 is installed over the channel 12. Here, the tab extension 56 extends through a slot 32 in the cover 30. When the conduit is disposed in the channel 12, the protrusions 52 matingly engage the grooves 102, with the slider being biased against the conduit 100 by a spring 70 that is located in and extends from the bore 58 at the first end 60 of the slider 50 to a lip 38 of the cover 30. As with the body 2, the slider 50 can have generally triangular sides. In other words, the sides of the slider 50 can diverge from the second end 62 toward the first end 60. This divergence should be sufficient to allow the slider 50 to travel within the body 2 so as to engage and disengage a conduit and to enable the receipt of different size conduits. Desirably the divergence angle of the slider sides is complementary to the divergence angle of the body sides.

The tab extension 56 is disposed through the slot 32 in the cover 30. The cover 30 comprises the slot 32, the lip 38, and connectors to attach the cover 30 to the body 2. The slot 32, which can be coaxial with the channel axis (i.e., the axis extending from the inlet end to the outlet end) can be sufficiently long to enable movement of the slide within the channel to allow insertion of a conduit 100. Optionally, the slot 32 can comprise locking openings extending away from the slot 32 toward a side 20 of the body 2. The locking opening(s) can enable the slide to be moved into engagement with the conduit 100 and locked in that location by moving the tab 54 such that the tab extension 56 moves into the locking opening, thereby preventing further movement of the slider 50 along the channel 12. Possible connectors include gripping tab(s) 34 and/or positioning bracket(s) 36. For example, the cover 30 can comprise positioning brackets 36 extending from sides of the cover, with openings therethrough sized to matingly engage cover connector 14 that extends from side(s) of the body 2. In the embodiment illustrated, to prevent inadvertent separation of the cover 30 from the body 2, the cover 30 can further (or alternatively) comprise the gripping tab(s) 34 designed to attach to (e.g., snap engage) the body 2, e.g., a ridge 28 extending away from the body in a direction away from the channel, and/or engage optional aperture 16 and/or optional aperture 18 in the sides 20.

Extending from one end of the cover 30 can be a lip 38 having a sufficient length to engage the spring 70 when it is located in the bore 58 in the assembled conduit connector. Alternatively, the spring 70 can engage a wall on the body, e.g., extending between sides 20, and/or can engage flange 22, whereby flange 22 can be designed to have a sufficient size to extend from the root surface 10 toward the cover 30 and provide a support surface for the spring 70.

The slider 50 has a conduit engagement portion on a conduit engagement side 64 comprising protrusions 66 designed to mate with the convolution grooves 102 in the electrical conduit 100 and to inhibit inadvertent withdrawal of the conduit 100 from the channel 12. In some embodiments, some or all of the protrusions 66 are resilient members capable of flexing (e.g., bending) as the conduit is inserted into the channel 12. Alternatively, or in conjunction, some or all of the protrusions 66 can be rigid (i.e., inflexible members that do not bend as the conduit is forced past the members during insertion into the channel). Generally the slider 50 comprises a sufficient amount of protrusions 66 to securely retain the conduit 100 in the channel 12. Although up to and exceeding 15 protrusions can be used, depending upon the size of the connector and the conduit, generally, for most conduits, up to 10 protrusions is sufficient, specifically, 2 to 8 protrusions can be used, more specifically, 2 to 6 protrusions.

Installation of a conduit 100 into the channel 12 of the body 2 can be accomplished by forcing the conduit past the slider 50, or by moving the slider totally or partially out of the path of the conduit. Hence, the conduit 100 can be pushed into the channel 12 such that, as the conduit is inserted into the channel 12, ridges of the conduit 100 apply a force on the protrusions 66, sufficiently forcing the slider 50 toward the outlet end 26 and enabling the insertion of the conduit 100. In some embodiments, due to the force exerted by the compression spring 70, however, the slider 50 moves toward the outlet end 26 only a sufficient distance to enable the insertion of the particular conduit. Alternatively, a force can be manually exerted on tab 54 to move the slider 50 toward the outlet end 26, out of the path of the conduit 100, compressing spring 70, and enabling facile insertion of the conduit 100. The slider can then be moved (or allowed to move) back toward the inlet end 24. Optionally, once in the channel, the conduit 100 can be adjusted to ensure that the protrusions 66 engage the grooves 102, thereby holding the conduit 100 within the channel 12 and/or establishing an electrical ground.

Figure 5:
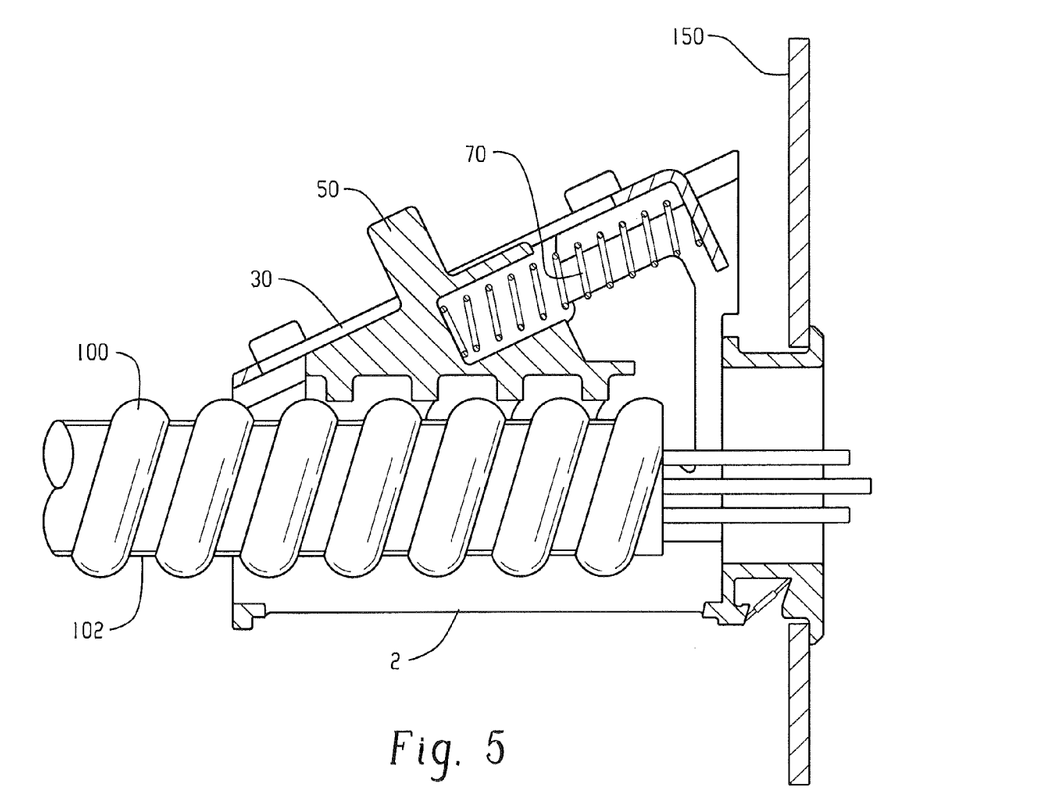
FIG. 5 is a cross-sectional side view of the conduit connector of FIG. 1 connected to an enclosure.
Figure 6:
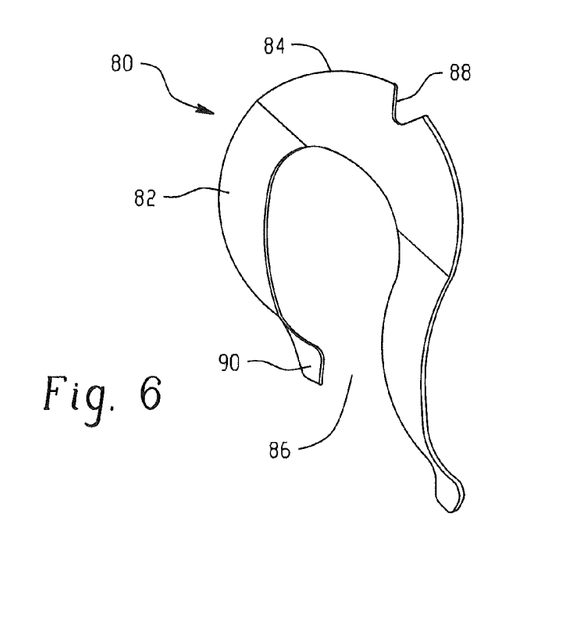
FIG. 6 is a perspective view of an embodiment of the spring clip.

The spring clip 80 can engage an outside of the enclosure and the connector body 2 so as to compress tabs 6,8 of the body 2 against an interior of the enclosure. In this embodiment, the spring clip 80 can be attached to the body before or after the body is attached to the enclosure. In any of these methods, the cable can be inserted into the cavity before or after attachment of the body to the enclosure, and/or before or after attachment of the spring clip to the body.

On the outlet end 26 of the body 2 can be a spring clip 80. The spring clip (e.g., a leaf spring) 80 is configured to engage the body 2 and the junction box (not shown), e.g., to hold the leading and following tabs against an inner surface of the junction box. The spring clip comprises a general geometry enabling it to mate with the connector body 2 such that when the connector is attached to a junction box, the spring clip 80 exerts a force on the connector body 2 and the junction box, thereby pulling the leading and following tabs 6, 8 into a firm engagement with an interior wall of the junction box. The geometry can be generally "U" shaped with a convex/concave mid-portion 82 such that the spring clip curves outward from both the first end 84 and the second end 86 toward the mid-portion 82; it is bowed (e.g., arched). The spring clip 80 can comprise a resilient material such as metals (e.g., zinc, steel, aluminum, iron, bronze, beryllium, copper and so forth), plastic, and/or any other material with a spring/memory quality, or a combination comprising at least one of the foregoing, such as spring steel.

The spring clip further comprises a first end 84 and a second end 86. In an embodiment, the spring clip can comprise a notch 88 located at the first end 84 configured to engage with a projection 40 on the body 2 at the secondary edge, e.g., to facilitate proper alignment of the spring clip, facilitate installation of the spring clip, and/or to enhance retention of the spring clip as desired. The spring clip 80 further comprises angled lip(s) 90 located at the second end 86 configured to engage the secondary edge (e.g., flange 22) and/or sides 20. The spring clip 80 does not enter the opening in the junction box 150, but rather remains on the outside of the opening before and after installation. The spring clip 80 secures the connector to the opening in the junction box 150 and prevents the connector from releasing from the opening after the connector has been straightened. The spring clip 80 forms the desired compressive force, retaining the connector in place.

Optionally, the mating of the notch 88 located at the first end 84 of the spring clip 80 and the projection 40 located on the body 2 can be used to aid in stabilizing and securing the spring clip 80 in the box engagement region 4. The projection 40 can protrude from the body 2 at any appropriate angle to attain the desired securing and stabilizing. For example, the projection 40 can form a substantially 90° angle with the secondary edge 9, or the projection can form a less than 90° angle with the secondary edge 9, projecting down toward the root surface 10 (e.g., forming an angle of 35° to 75°).

The electrical connector has utility, among other uses, in connection of conduit(s) to junction boxes. The conduit engagement region can cooperate with a variety of conduit(s), cables, and other electrical conductors. The conduit connector can be used in a variety of fashions including, connectors for metallic conduits, non-metallic flexible conduits, armored cables, metal clad (MC) cables, non-metallic sheathed cables, flexible metal conduits, cord grip/strain relief/cable gland connectors, etc.

In an embodiment, a method for connecting a connector to a junction box 150 comprises: angling the connector toward the opening in the junction box 150, inserting the leading tab 6 into the opening; inserting the follower tab 8 into the opening; straightening the connector in a downward direction while pushing the box engagement region 4 in a forward (e.g., toward the junction box) and upward direction; and, if not already on the body, placing the spring clip 80 onto the body 2, wherein the spring clip 80 engages the body 2 and a junction box 150. The central axis can be reoriented orthogonally to the knockout (opening) while holding the knockout edge in contact with the root surface 10. In an embodiment, the root surface central axis can be offset from the body's central axis toward the follower tab by a sufficient amount (e.g., greater than or equal to 8%) to accommodate a larger variation in standard knockout diameters thereby providing for easier installation. During reorientation of the body 2, the follower tab 8 passes through the knockout. At this point, both the leading and follower tabs 6,8 are on the inside of the junction box 150.

The body 2 is drawn tight to the junction box 150, by a force exerted by the spring clip 80 as it presses against the box exterior surface and against the body. Since the tab perimeter diameter is greater than the knockout (opening) diameter, when the body 2 moves orthogonally away from the junction box 150, the leading tab and follower tab primary contact surfaces engage the box interior surface.

Previously, a locknut required a great degree of tactility to hold and to thread onto the male threaded connector, the difficulty of which is accentuated and prolonged when wearing gloves. So, even in frigid temperatures, to reduce the installation time, electricians generally do not wear gloves to protect their hands. Unlike the two-part locknut or snap-in connectors, by reversing the above installation procedure, the body can be easily removed from the junction box and then later reused. The connector may also be easily installed while wearing gloves. Additionally, the connector does not require access to the interior of the junction box to rigidly connect the conduit to the junction box. All connections between the conduit and the junction box can proceed without opening or removing the cover of the junction box.

The present conduit connector answers a long felt need for an electrical connector which can be installed quickly and easily without tools, does not require access to the interior of a junction box, and does not need to be disassembled before connecting it to an electrical enclosure. This conduit connector succeeds in reducing cost by saving time and labor during both manufacturing and installation. The connector also occupies minimal space inside the box, reducing or eliminating interference problems that may occur with standard locknut connectors (e.g., when the installer must shorten the device mounting screws). The conduit connector further increases safety, as no fingers or tools touch the inside of the connector, where hot, energized areas are located.

The terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The terms "front", "back", "bottom", and/or "top" are used herein, unless otherwise noted, merely for convenience of description, and are not limited to any one position or spatial orientation. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments.

What is claimed is:

1. A conduit connector comprising:
    a body comprising a box engagement region capable of engaging an opening in an enclosure and a channel having body sides that diverge from an inlet end toward an outlet end, wherein the sides have a cover connector;
    a cover disposed across the channel and mated with the cover connector, wherein the cover has a slot therein; and
    a slide located in the channel, and having
        slide sides that diverge toward the outlet end, wherein an angle of divergence of the slide sides is complementary to the divergence of the body sides,
        a guide tab located on a side of the cover opposite the channel with a tab extension extending through the slot to the guide tab, and
        having protrusions extending into the channel and having a size and geometry to engage a convolution on a conduit.

2. The conduit connector of claim 1, wherein the box engagement region has a root surface, a leading tab, and a follower tab wherein the root surface and leading tab are located between a leading edge and a secondary edge; and wherein a leading tab perimeter edge and a follower tab perimeter edge define a tab perimeter diameter that is larger than an opening in the enclosure.

3. The conduit connector of claim 1, further comprising a spring clip, wherein when the box engagement region has been attached to an enclosure, the spring clip can be disposed to engage the box engagement region and the enclosure.

4. The conduit connector of claim 1, further comprising a locknut in the box engagement region to secure the connector to the enclosure.

5. The conduit connector of claim 1, wherein the cover snap attaches to the body.

6. The conduit connector of claim 1, wherein the cover further comprises a lip extending from the cover toward the body and configured to support a spring extending from a bore.

7. The conduit connector of claim 1, wherein the body further comprises a flange extending between the sides and configured to support a spring extending from a bore.

8. The conduit connector of claim 1, wherein the body further comprises a flange extending from the root surface toward the cover and configured to support a spring extending from a bore.

9. The conduit connector of claim 1, further comprising a spring located in and extending from a bore, wherein the bore extends into the slide from a first end.

10. A method for attaching a conduit to an enclosure, comprising:
    moving a slider of a conduit connector to insert a conduit into a channel of the conduit connector, wherein the conduit connector comprises
        a body comprising a box engagement region and the channel, wherein the channel has body sides that diverge from an inlet end toward an outlet end, wherein the sides have a cover connector;

a cover disposed across the channel and mated with the cover connector, wherein the cover has a slot therein; and the slide located in the channel, and having
- slide sides that diverge toward the outlet end, wherein an angle of divergence of the slide sides is complementary to the divergence of the body sides,
- a guide tab located on a side of the cover opposite the channel with a tab extension extending through the slot to the guide tab, and
- having protrusions extending into the channel;

engaging the protrusions of the slide with convolutions on the conduit; and attaching the conduit connector to the enclosure.

11. A method for attaching a conduit to an enclosure, comprising:

inserting a conduit into a channel and past a slider of a conduit connector, wherein the conduit connector comprises a body comprising a box engagement region and the channel, wherein the channel has body sides that diverge from an inlet end toward an outlet end, wherein the sides have a cover connector;

a cover disposed across the channel and mated with the cover connector, wherein the cover has a slot therein; and the slide located in the channel, and having
- slide sides that diverge toward the outlet end, wherein an angle of divergence of the slide sides is complementary to the divergence of the body sides,
- a guide tab located on a side of the cover opposite the channel with a tab extension extending through the slot to the guide tab, and
- having protrusions extending into the channel;

engaging the protrusions of the slide with convolutions on the conduit; and attaching the conduit connector to the enclosure.

* * * * *